3 Sheets--Sheet 3.
John K. O'Neil's Imp'd Straw and Hay Cutter.
No. 120,314.  Patented Oct. 24, 1871.
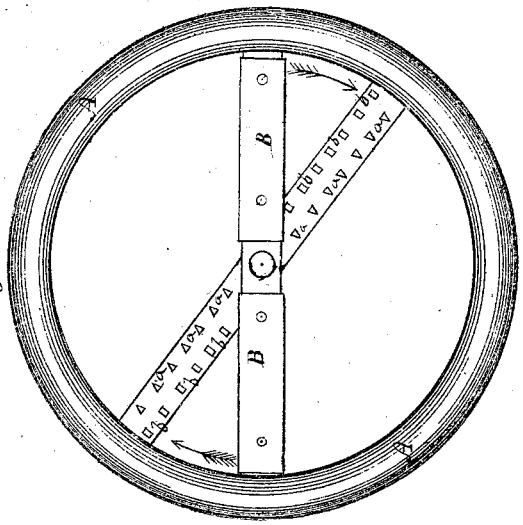
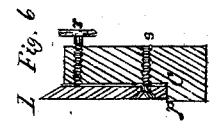
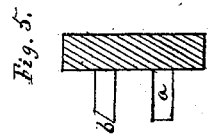
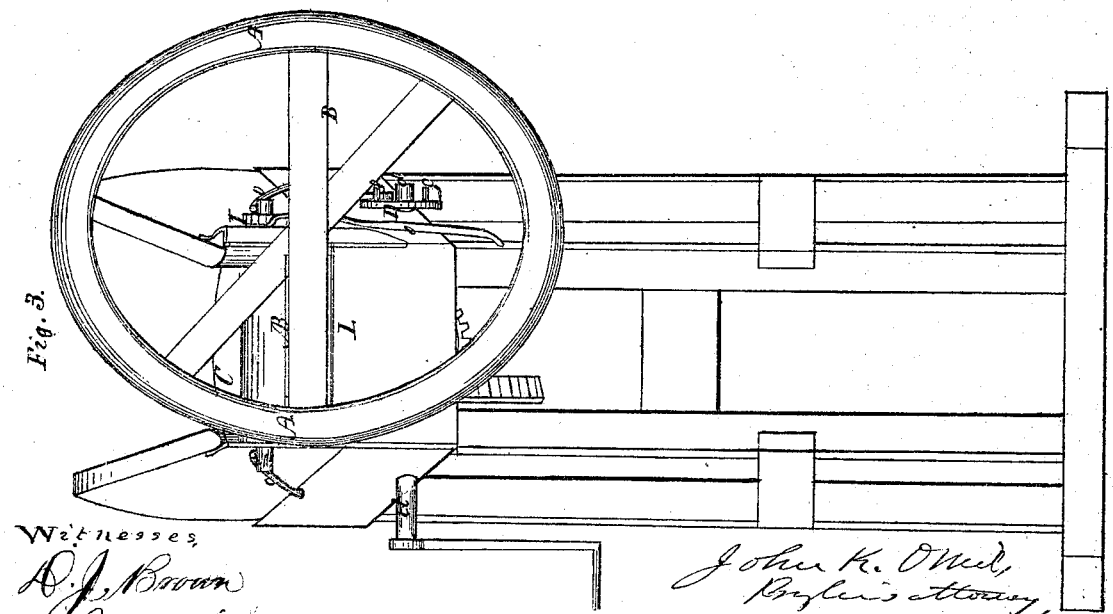
Witnesses: D. J. Brown, R. D. Smith
John K. O'Neil, By his Attorney, J. A. Brown 120,314

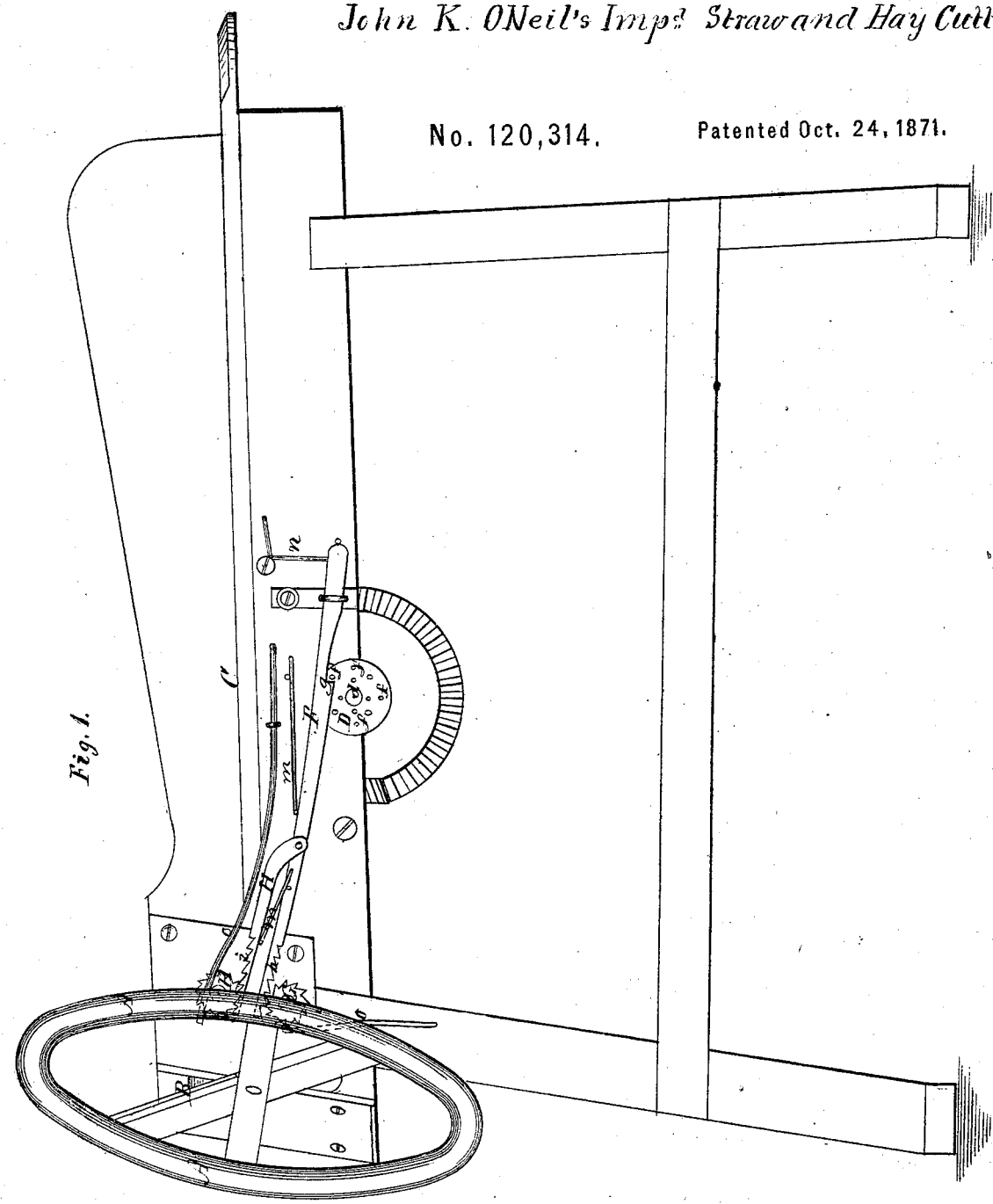

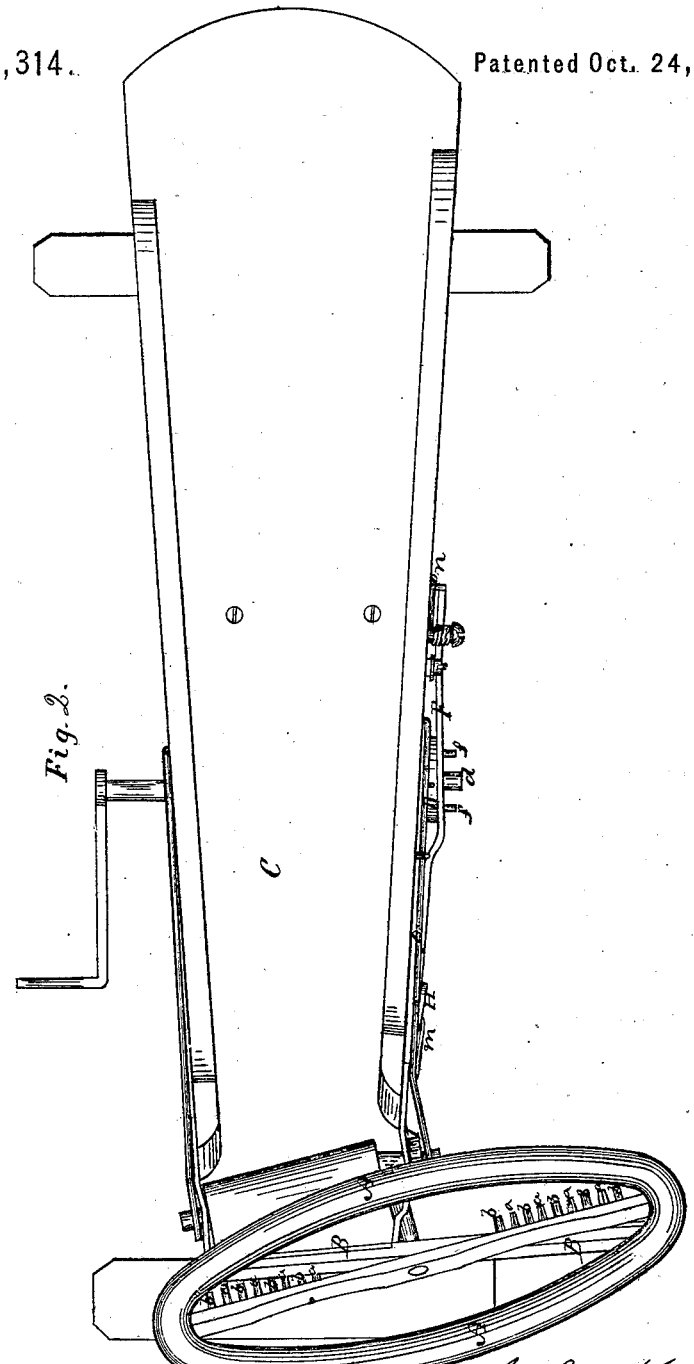

UNITED STATES PATENT OFFICE.

JOHN K. O'NEIL, OF KINGSTON, NEW YORK.

IMPROVEMENT IN STRAW-CUTTERS.

Specification forming part of Letters Patent No. 120,314, dated October 24, 1871.

*To all whom it may concern:*

Be it known that I, JOHN K. O'NEIL, of Kingston, in the county of Ulster and State of New York, have invented an Improved Straw, Hay, and Stalk-Cutter; and I do hereby declare that the following is a full and exact description thereof, reference being had to the accompanying drawing making part of this specification—

Figure 1 being a side elevation of a straw, hay, and stalk-cutter provided with my improvements. Fig. 2, a top view of the same. Fig. 3, an end view thereof. Figs. 4, 5, and 6 views of parts detached.

Like letters designate corresponding parts in all the figures.

Two main objects are aimed at in this invention: first, to cut the straw, hay, or stalks with the least power by the most efficient oblique cut; and second, to comminute or shred and chip fine the pieces cut off. I effect these purposes substantially as follows: The revolving cutter-wheel A, on which the moving cutting-knives B B are placed, is situated in a doubly-oblique position in relation to the stalks and the stems of the straw and hay, as they are fed in a longitudinal direction in the feeding box or trough C—that is, oblique to a vertical plane, and oblique to a horizontal line at right angles to the direction of the feeding-box, as clearly represented in Figs. 1 and 2. Thus the knives cut obliquely through the stalks and stems in the direction of their action, and cut obliquely to the fibers thereof at every point of their action. It is, therefore, evident that every possible advantage of the oblique cut is secured by this arrangement, one of which is that the stems and stalks are split and partially divided by the knives. The angle of obliquity in either direction may be about as indicated in the drawing, or may vary therefrom if found in any case preferable. Upon the cutting-wheel A, also, I arrange two sets of comminuting cutters, $a\ a$ and $b\ b$, preceding each knife B, the arrangement being substantially as represented in Fig. 4. One set, $a\ a$, of these cutters has knife-shaped or longitudinal cutting-edges, so as to shred or cut the stems or stalks longitudinally; and the other set, $b\ b$, of cutters has chisel-edges on its ends, so as to cut the stems or stalks transversely. These cutters, preceding the knives B B but not acting till the stems and stalks have been fed along, yet still held in place by the feeding-rollers, work very efficiently to chop the stems and stalks fine, and to remove all impurities therefrom without interfering with the action of the severing-knives. In order to render the action of the shredding and chopping-cutters the most efficient, the straw, hay, or stalks should be fed along quickly and momentarily at intervals, so that they may be at rest while both the said cutters and the knives are acting on them. To effect this mode of feeding I employ a device, seen most clearly in Fig. 1. To the driving-shaft $d$ is attached a disk or wheel, D, having pins $f\ f$ secured, at regular distances apart, in a circular line upon its face. These pins successively strike a notch, $g$, of a sliding ratch-bar, F, the teeth $h\ h$ of which match into the teeth of a ratchet-wheel, G, on the shaft of the lower feed-roller; and a branch ratch-bar, H, pivoted thereto, has teeth $i\ i$, which match into the teeth of another ratchet-wheel, I, on the shaft of the upper feed-roller; there being a spring, $m$, to keep the two ratch-bars F and H separated and pressed against their respective ratchet-wheels, but to yield in the backward motion of the ratch-bars. A spring, $n$, retracts suddenly the ratch-bars after each forward movement, which is made quickly and effects the feed movement required. Stationary spring-holders or pawls $o\ o$ prevent the feed-rollers from turning backward. The stationary knife L, as shown particularly in Fig. 6, rests on a shoulder, $p$, of the feeding-box; and it has two sets of screws, one, $r\ r$, for adjusting the edge of the knife accurately to the cutting-knives A A, and the other set, $s\ s$, for tightening the knife in its adjusted position.

What I claim as my invention, and desire to secure by Letters Patent, is—

1. The arrangement of the cutting-knives B B, in combination with the feeding-box C, so as to cut the straw, hay, or stalks in doubly-oblique directions, substantially as and for the purpose herein specified.

2. The two sets of comminuting cutters $a\ a$ and $b\ b$, one set being knife-edged, so as to slit longitudinally, and the other set chisel-edged, so as to sever transversely, in combination with the main cutting-knives B B, as and for the purpose herein specified.

3. The pin-disk D, reciprocating ratch-bars E H, ratchet-wheels G I, and retracting spring $n$, constructed, arranged, and operating in combination with the knives B B and cutters $a\ a$ and $b\ b$, in the manner and for the purpose herein specified.

Specification signed by me this 5th day of December, 1870.

JOHN K. O'NEIL.

Witnesses:
   JOHN E. VAN ETTEN,
   GEORGE VAN ETTEN.      (59)